S. Hungerford,
Steam-Boiler Furnace,
N° 5,712.
Patented Aug. 15, 1848.
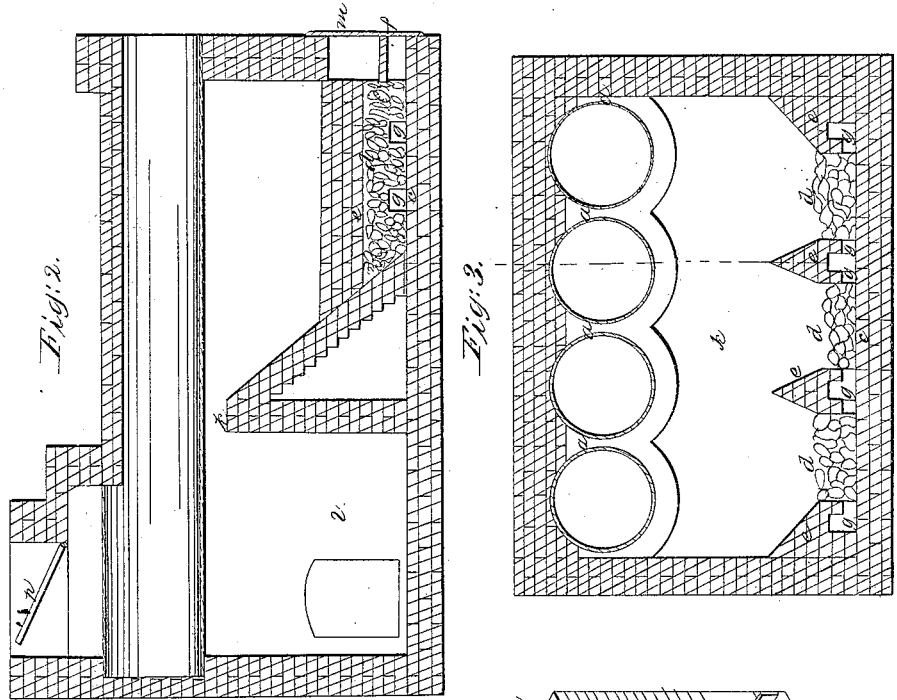
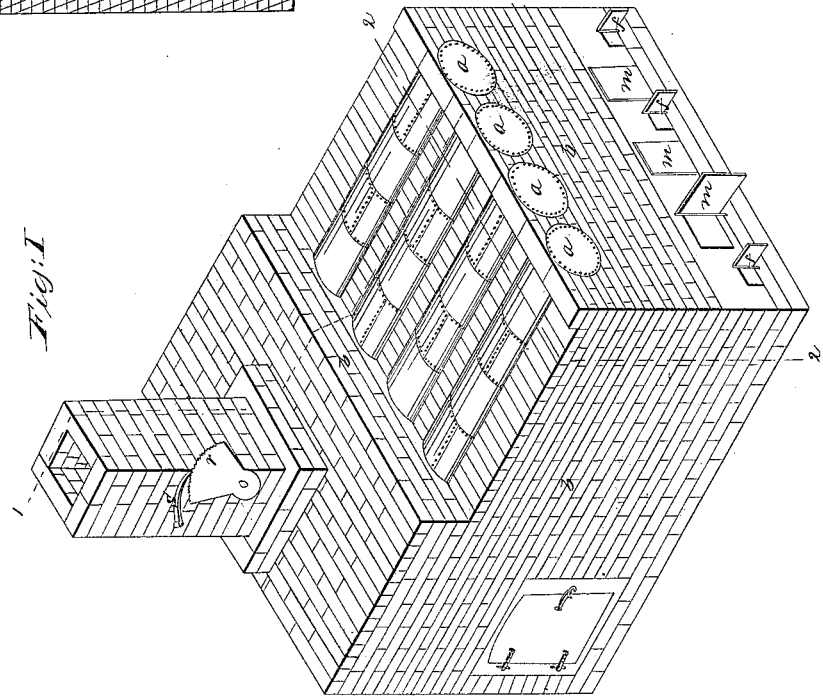

UNITED STATES PATENT OFFICE.

SPENCER HUNGERFORD, OF SLATERVILLE, NEW YORK.

BOILER-FURNACE.

Specification of Letters Patent No. 5,712, dated August 15, 1848.

*To all whom it may concern:*

Be it known that I, SPENCER HUNGERFORD, of Slaterville, in the county of Tompkins and State of New York, have invented certain new and useful Improvements in Furnaces for Steam-Boilers and other Purposes, of which the following is a full and exact description, reference being had to the annexed drawings of the same, making part of this specification, in which—

Figure 1 is an isometrical perspective view, Fig. 2 is a vertical section through the line 1, 1, of Fig. 1, and Fig. 3 is a vertical section through the line 2 2 of Fig. 1.

The same letters indicate the same parts in all the figures.

The accompanying drawings are intended to represent my improvements applied to the furnace of a series of horizontal steam-boilers as one example in illustration of the principle of my discovery, but I do not intend to confine the application of my invention to the particular form and arrangement of boilers herein represented, as it is obviously applicable to steam and other boilers of every diversity of form and arrangement.

*a a a a* are a series of cylindrical steam boilers inclosed in walls of brick-work *b* as represented in all the figures.

*c* is the bottom of the furnace which is solid and occupies the position of the grate of a common furnace. This bottom is divided into narrow troughs or compartments *d* by hollow walls *e* of fire tiles or bricks. The interior of these walls communicates with the external atmosphere by orifices made through the outside walls *b*, which orifices are closed by the doors or registers *f*. The bottom of the hollow walls *e* on a level with the bottom of the troughs *d* is perforated by a sufficient number of holes or twyers *g* of suitable size to supply the fuel placed in the troughs with air, which may be drawn through the interior of the walls *e* and twyers *g* by the draft of the chimney, or may be forced in by bellows. The hollow walls which sub-divide the bottom of the furnace may be straight, curved, or irregular, but should not be higher than is necessary to partition off the fuel into a series of separate fires, in order that the space left above them may be sufficient for the flame of all the fires to unite into one mass before coming into contact with the boilers, which it will then heat with great uniformity over every part of their surface exposed to its action.

*k* is the bridge. It is placed in an inclined position in order that the current of air and flame may more easily carry over it and drop into the receptacle *l* the residuum resulting from the combustion of the fuel. This residuum is in very small quantity. The alkaline and other vaporable matter constituting the bulk of the ashes from common furnaces, are by the more intense heat of this furnace decomposed and volatized.

The fuel is introduced into the furnace through apertures in the wall *b*, which are opened and closed as occasion may require by the doors *m m m m* Fig. 1. The fuel rests upon the bottom of the troughs *d* and the air from the twyers *g* circulates copiously among it in all directions, producing an energy of combustion and development of heat heretofore unattained in boiler furnaces, and as a necessary consequence a corresponding saving of fuel, (amounting to fifty per cent of the whole quantity used in a common grate furnace). Every particle of matter contained in the fuel which is capable of combustion is converted into flame and rendered available for heating the boiler, and therefore there is no smoke emitted from the chimney. These facts are fully borne out by a great number of experiments upon the large scale fairly tested under widely differing circumstances.

The space *n* above the rear end of the boilers is for the purpose of forming a free communication with the chimney from both sides of the furnace, so that the heat may be evenly distributed beneath the boilers by causing an equal and unobstructed draft through the spaces between them.

The damper *p* in the chimney is for the purpose of either stopping altogether, or regulating the force of the draft. It can be held in any required position by means of the ratch *r* and pawl *s;* when an active fire is required the damper *p* and the doors *f* are opened, and the doors *m* (excepting when fuel is being introduced into the furnace) are closed; the furnace of a steam engine worked through the day only, is filled with green wood or other fuel, at night, when the work is suspended, and all the doors of the furnace and the damper in the chimney closed the fuel will be coked during the night with but little loss, and sufficient heat will be evolved to keep up the steam so that by opening the draft for five minutes before commencing work in the morning there will be a full head of steam.

What I claim as my invention and desire to secure by Letters Patent is—

Dividing the fire place of the furnace by hollow perforated walls, the twyers for admitting the blast or draft being on a level with the bottom of the fire chamber, substantially in the manner and for the purpose herein described.

SPENCER HUNGERFORD.

Witnesses:
P. H. WATSON,
STEPHEN W. WOOD.